United States Patent [19]

Embree

[11] 4,215,675
[45] Aug. 5, 1980

[54] SOLAR HEATING COLLECTOR ASSEMBLY

[76] Inventor: John M. Embree, 2606 Lawrence Rd., Charlottesville, Va. 22901

[21] Appl. No.: 914,896

[22] Filed: Jun. 12, 1978

[51] Int. Cl.² .............................................. F24J 3/02
[52] U.S. Cl. .................................. 126/446; 126/448; 126/450
[58] Field of Search ................ 126/446, 450, 447, 448

[56] References Cited

U.S. PATENT DOCUMENTS

| | | | |
|---|---|---|---|
| 3,039,453 | 6/1962 | Andrassy | 126/447 |
| 4,011,856 | 3/1977 | Gallagher | 126/446 |
| 4,144,931 | 3/1979 | Medico | 126/446 |

FOREIGN PATENT DOCUMENTS 47-46413 of 1972 Japan ...................................... 126/448

*Primary Examiner*—Carroll B. Dority, Jr.
*Attorney, Agent, or Firm*—Oblon, Fisher, Spivak, McClelland & Maier

[57] ABSTRACT

A solar heating collector assembly employing at least one collector panel which utilizes a collector plate formed of a plurality of long overlapping fins to absorb solar energy. Each absorber fin is coated with a substance having a predetermined selectivity and has soldered lengthwise thereto an absorber pipe in which a heat transport fluid is heated as the fluid circulates through the collector panel. The collector absorber plate is mounted on a collector frame over a plywood base having an aluminum foil vapor barrier covering the base. A double glazed glass assembly is mounted over the absorber plate and forms the top surface of the collector panel. The collector panel is disposed between a pair of installation tracks which define a pair of plumbing channels at opposite ends of the absorber pipes. Located within the plumbing channels are input and output pipe manifolds which are respectively connected to opposite ends of the absorber pipes. When a plurality of collectors panels are employed, input and output header pipes are respectively connected to the input and output manifold pipes to integrate fluid flow through the solar heating collector assembly. Side tracks are disposed perpendicular to the installation tracks and in combination therewith defines the perimeter of the collector assembly. Each collector panel frame is provided with a metal lining around the periphery thereof in contact with the glass assembly to provide heat sinking of the peripheral seal of the glass assembly and to provide a condensation surface for the collector panel. Likewise, the installation tracks and the side tracks are also provided with metal linings. Metal caps having mitered corners are then riveted to the metal liners of the collector frame, the installation tracks and the side tracks to securely fasten the collector assembly, the metal liners thus also serving as rivet anchors.

16 Claims, 9 Drawing Figures

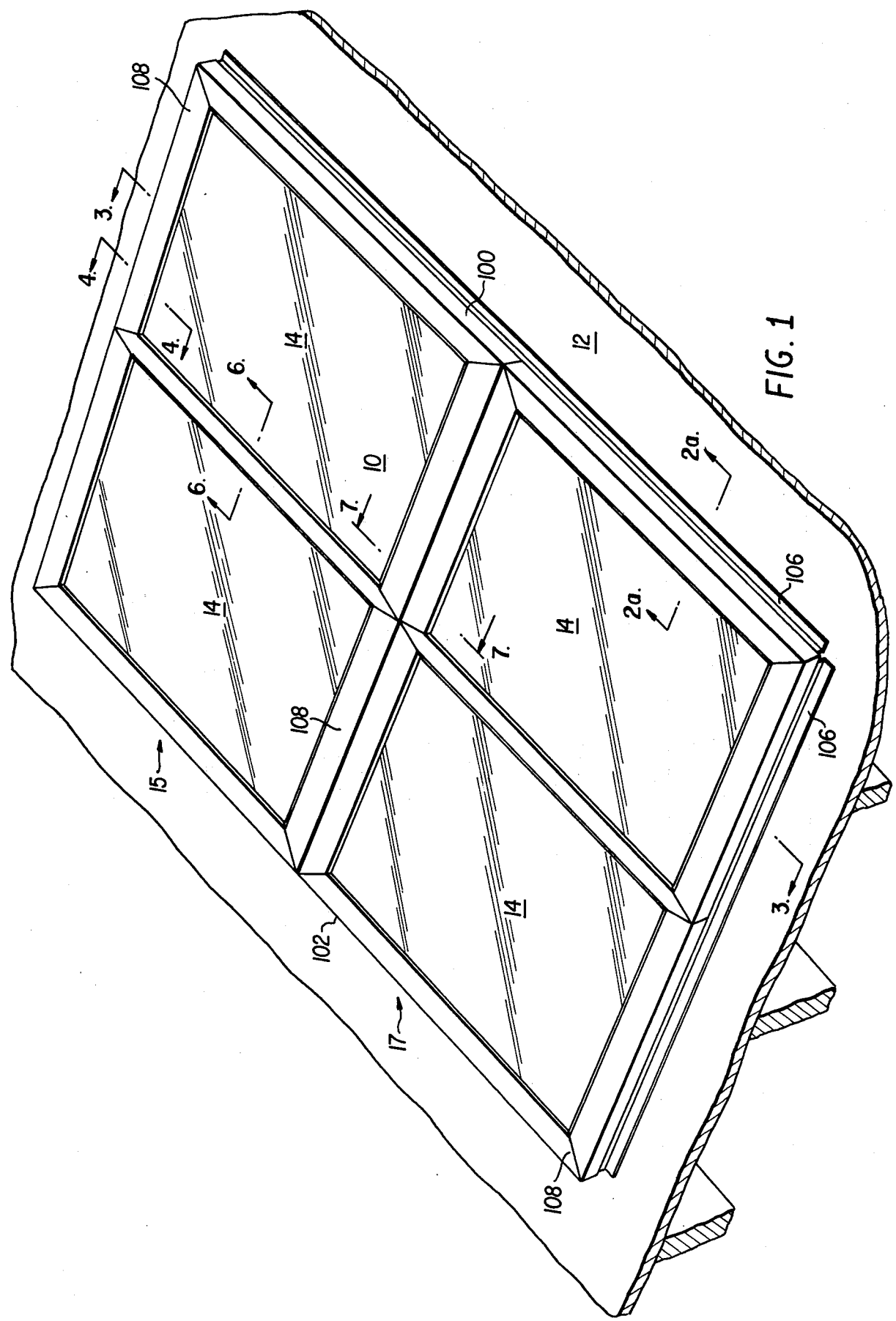

SOLAR HEATING COLLECTOR ASSEMBLY

BACKGROUND OF THE INVENTION

1. Field of the Invention

This invention relates to solar heating, and more particularly to a low cost solar heating collector assembly which can be used for a wide variety of domestic or commercial applications.

2. Description of the Prior Art

As is common knowledge, the recent energy crisis caused by acute shortages of conventional fuel sources has precipitated a considerable amount of interest in solar energy as an alternate energy source. Thus, in recent years a wide variety of solar energy heating systems and components have evolved to harness solar energy for use in both domestic and commerical heating and air conditioning applications.

A critical component of all previous solar heating systems is the solar collector employed to absorb solar energy. As is well known, these collectors must not only be thermally efficient, but also strongly constructed since these collectors must withstand the extremes of wide ranges of temperature, wind, rain, and various other elements of weather. A further constraint on the design and fabrication of solar collectors is that the collectors must be relatively inexpensive if solar heating is to successfully compete with conventional sources of energy. Hence, it is commercially imperative that readily available materials be utilized in the fabrication of solar collectors.

Although various heating fluids have been employed by prior solar collectors to absorb impinging solar energy, it appears that liquids, and particularly water, are most commonly employed. Therefore, most solar collectors employ plumbing systems of varying sophistication in which to circulate the heating fluid through the interior of the collector. While serpentine plumbing configurations are often used interior to the collector in order to increase the volume of water within the zone of energy absorption and to reduce the plumbing connections, serpentine plumbing unfortunately is less reliable from a draining standpoint, as is necessary in the event of reduced temperatures. On the other hand other collectors of the prior art have employed heat exchange tubes which extend in substantially parallel spaced apart relationship between headers within the interior of the collector under the glazing. While such a plumbing configuration is significantly more reliable from a draining standpoint, it nevertheless results in a number of plumbing connections within the interior of the collector. These plumbing connections are satistically susceptible to leakage which adversely affects collector performance and for repair requires virtually complete disassembly of the individual collector, in order to remove the glazing to make the connections accessible.

A further consideration in the design of solar collectors is the solar to thermal energy conversion effectiveness of the individual collector panels. This performance characteristic is generally controlled by using an energy absorbing surface with a predetermined selectivity, which is discussed in somewhat more detail hereinafter. It is noted, however, that for most domestic applications, energy absorbing surfaces with a relatively low selectivity are acceptable. On the other hand, certain applications, such as air conditioning, do require higher selectivity. For the most part, however, the construction techniques employed in collectors of the prior art have produced a finished product in which it is relatively difficult to precisely match the selectivity of the collector with the required selectivity of the particular application. Since collector selectivity is directly related to collector cost as a result of the different materials employed, the desirability of producing a collector in which the selectivity can be carefully selected is readily apparent.

Yet another important consideration is the ease in which a collector assembly is installed, and the degree of safety afforded to the workmen performing the installation. Since collectors are commonly employed on steeply inclined roofs, it is highly important that the individual collectors of an assembly be prevented from sliding or slipping prior to the rigid fastening of the collector to the roof. However, since in the prior art most collectors are simply nailed or bolted directly to the roof surface, difficulty has been experienced in preventing dangerous collector slippage during installation.

While enumerable solar collectors are found in the prior art, typical examples are found in U.S. Pat. Nos. 3,937,208; 3,980,071; 3,974,822; 4,003,363, 4,011,856; 4,063,545 and 4,066,063.

SUMMARY OF THE INVENTION

Accordingly one object of this invention is to provide a novel solar heating collector assembly which is inexpensively fabricated of readily available materials.

Another object of this invention is to provide a novel solar heating collector assembly ruggedly constructed and capable of withstanding adverse weather conditions.

Yet another object of this invention is to provide a novel solar heating collector assembly which is easily and safely installed.

A further object of this invention is to provide a novel solar heating collector assembly which is easily maintained.

Another object of this invention is to provide a novel solar heating collector assembly in which a predetermined selectivity ratio of an individual collector is flexibly implemented for a particular application.

These and other objects of this invention are achieved by providing a solar heating collector assembly constructed of at least one solar collector panel which utilizes a flat energy absorbing plate made of a plurality of long overlapping copper fins. Soldered lengthwise to each fin is a copper heat exchange pipe for circulating a heat transport fluid, such as water, in close proximity to the fins and thereby producing heat exchange therebetween. The surface of each fin is provided with a coating of a particular selectivity such that the overall selectivity of the collector panel is determined by the selectivity of the individual panel fins.

Each collector panel is constructed of a plywood base to which is fastened a metal lined stepped peripheral frame which forms the exterior walls of the panel. An aluminum foil reflective surface is applied to the plywood base to serve as a vapor barrier and as an initial layer of insulation. The panel energy absorbing plate is then supported on a first step of the peripheral frame with the heat exchange pipe exiting opposite ends of the panel frame through insulated spacer holes designed sufficiently large to accommodate thermal expansion of the pipes. On a second step of the frame above the panel energy absorber is supported a double glazed glass assembly formed of two glass sheets separated by a desiccant substance, with the glazed glass assembly serving as the top surface of the collector panel.

The heat exchange pipes of the collector panel energy absorber plate are interconnected exterior to the collector panel at opposite ends thereof by means of top and bottom manifolds. The manifolds of the individual collector panels are then connected to a header system to integrate system fluid circulation.

Prior to installation of the individual collector panels, L-shaped metal lined installation tracks are fastened to the roof above and below where each collector panel is to be situated. Collector panels are then seated between installation tracks with the base of each collector panel mounted flush with the tracks. Thus, between the tracks and the panel frame are formed channels for containing the manifold and header plumbing. After interconnection of system plumbing and the application of appropriate sealants around the panel glazing, mitered sheet matal caps are horizontally and vertically riveted to the metal liners of adjacent installation tracks and the collector panel frame, thereby completing the collector assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic perspective view of an installed collector assembly according to the invention;

DETAILED DESCRIPTION OF THE PREFERRED EMBODIMENTS

Figure 3:
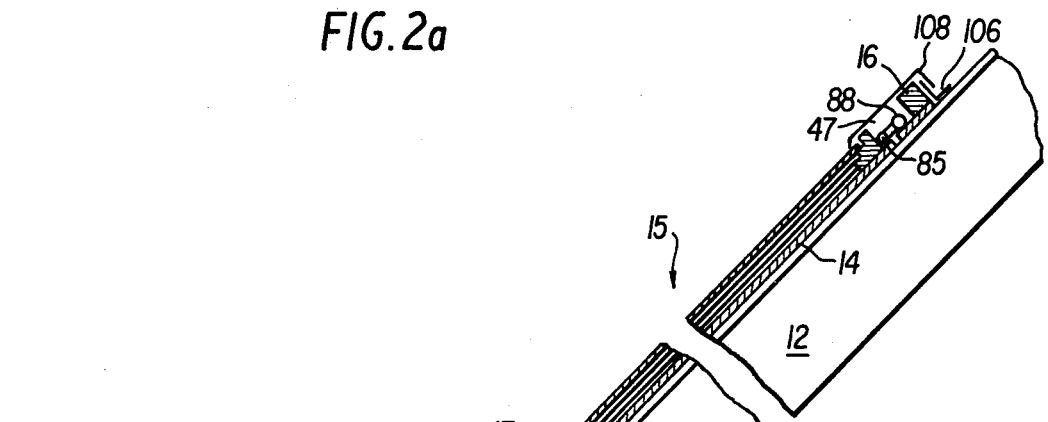
FIG. 3 is a schematic vertical cross-sectional view taken along the line 3—3 of FIG. 1.
Figure 4:
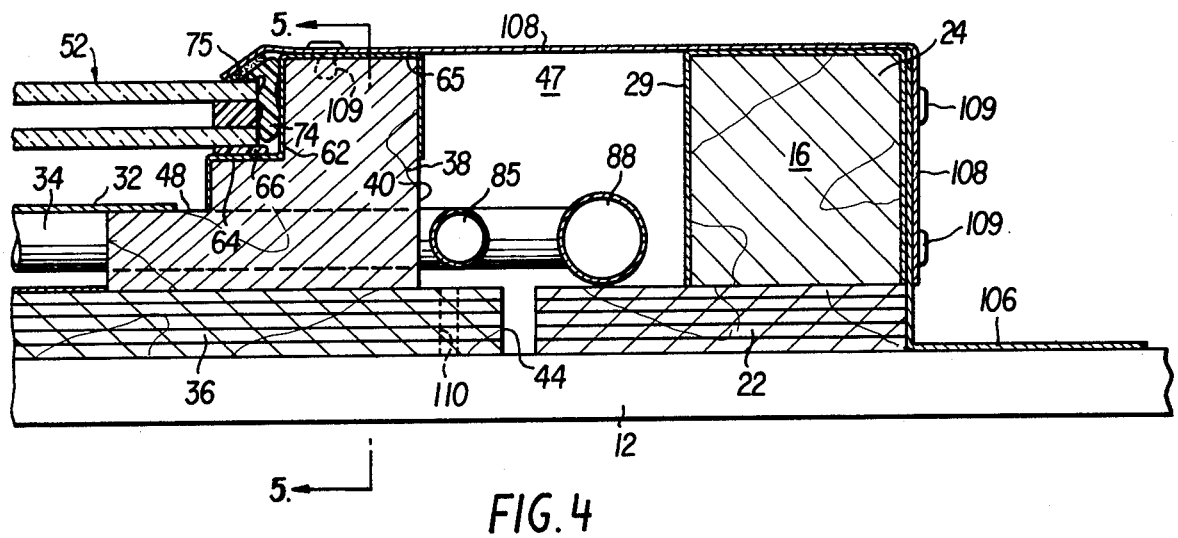
FIG. 4 is an enlarged schematic fragmentary vertical cross-sectional view taken along the line 4—4 of FIG. 1.
Figure 7:
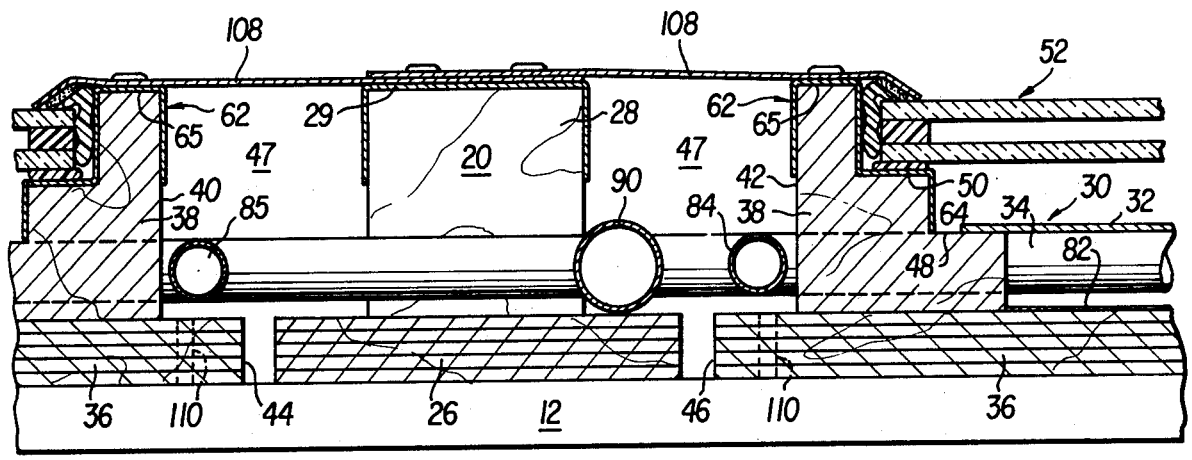
FIG. 7 is a schematic enlarged fragmentary vertical cross-sectional view taken along the lines 7—7 of FIG. 1.

Referring now to the drawings, wherein like reference numerals designate identical or corresponding parts throughout the several views, and more particularly to FIG. 1 thereof, the solar heating collector assembly 10 of the invention is shown in perspective mounted on an inclined roof 12. As seen in FIG. 3, the assembly 10 includes a plurality of identical collector panels 14 seated between L-shaped top and bottom installation tracks 16 and 18 respectively, and a middle T-shaped installation track 20. The L-shaped installation tracks 16 and 18 are formed of a base 22 and a leg 24. Similarly, the T-shaped installation track 20 situated centrally between the L-shaped installation tracks 16 and 18 is formed of a base 26 and a leg 28. Each of the installation tracks 16, 18 and 20 is provided with a sheet metal lining 29 rigidly fastened by conventional techniques to the legs 24 and 26 of the tracks 16, 18 and 20, as shown in FIGS. 4 and 7.

Prior to installation of the collector panel 14, the installation tracks 16, 18 and 20 are fastened to the roof 12 by conventional means, such as by nailing or screwing thereto. Thereafter, these installation tracks form a convenient ledge by which workmen can safely and comfortably manuever themselves across the roof while handling the collector panels during installation thereof. The collector panels 14 are then themselves seated in top and bottom rows between the top installation track 16 and the middle installation track 20, and between the middle installation track 20 and the bottom installation track 18.

Figure 2A:
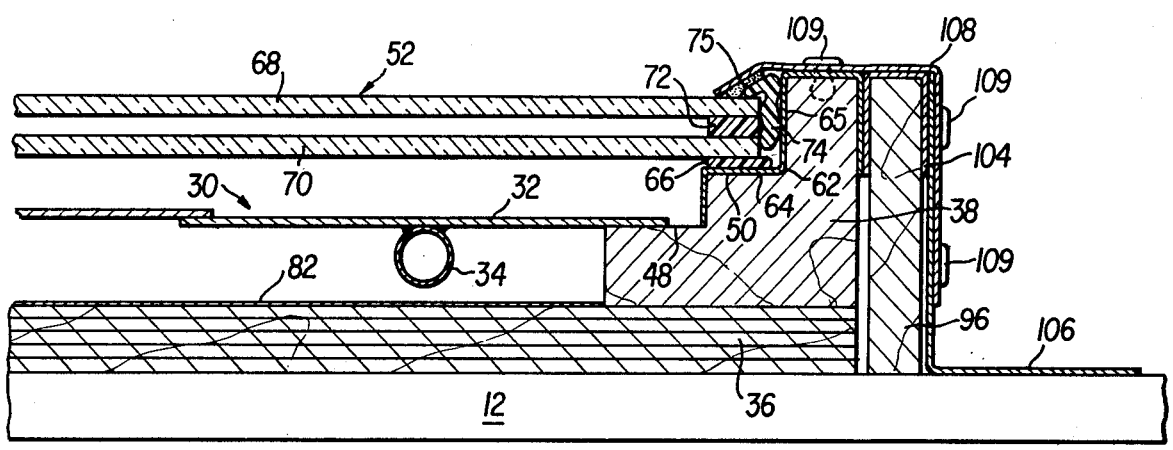
FIG. 2a is a horizontal cross-sectional schematic view through the heat absorber plate taken along the lines 2a—2a of FIG. 1.
Figure 2B:
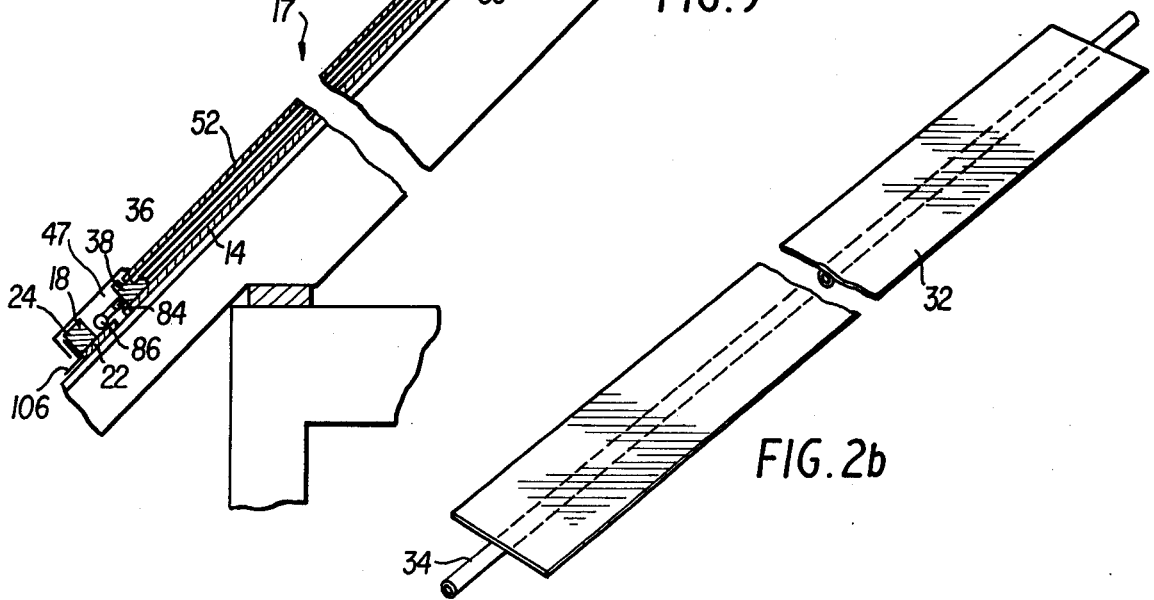
FIG. 2b is a perspective view of a single heat-absorbing element of a heat absorbing plate of a collector panel according to the invention.

As shown in FIGS. 2a and 2b, each collector panel 14 is provided with a heat absorbing plate 30 made of a plurality of long overlapping copper fins 32. Soldered lengthwise to each fin 32 is a copper heat exchange pipe 34 through which is circulated a heat transport fluid, such as water. The absorber pipes 34 are thus in close thermal proximity to the fins 32, thereby producing heat exchange between the fins 32 and the heat transport fluid. The surface of each fin 32 is provided with a coating which promotes a predetermined selectivity, where selectivity as is well known in the art is defined as the ratio of the absortivity to the emissivity, and where the absortivity is defined as the degree to which a surface converts light to heat, and where emissivity is defined as the degree to which a surface re-radiates heat to its environment. Typically, selectivity of the absorber fin can be varied from as high as 15 by plating the fin with black chrome, but for most applications a black flat paint coating providing a selectivity of 1.06 is perfectly adequate. It is noted, however, that a desired selectivity for any collector panel can easily be achieved by coating the individual absorber fins 32 of a heat absorbing plate 30 with different substances such that the combined effect of the individually coated absorber fin 32 produces the desired selectivity.

As shown in FIGS. 2a, 3, 4, 6 and 7, each collector panel 14 is constructed of a base 36 and peripheral frame 38 fastened to the base 36. The base 36 of each collector panel 14 extends beyond the top and bottom horizontal ends 40 and 42, respectively of the collector frame 38, with the top and bottom edges 44 and 46 respectively of the collector base 36 abutting against the adjacent installation tracks. Thus, between the leg of each installation track and the horizontal end of each collector panel 14 is formed a channel 47 wherein is located plumbing interconnections hereinafter described in more detail.

Figure 6:
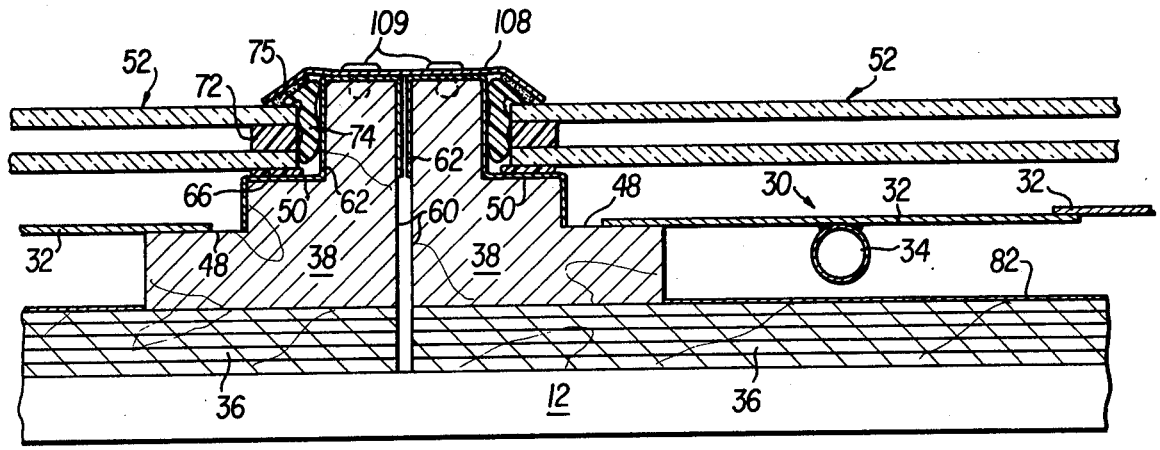
FIG. 6 is a schematic enlarged fragmentary vertical cross-sectional view taken along the lines 6—6 of FIG. 1.
Figure 5:
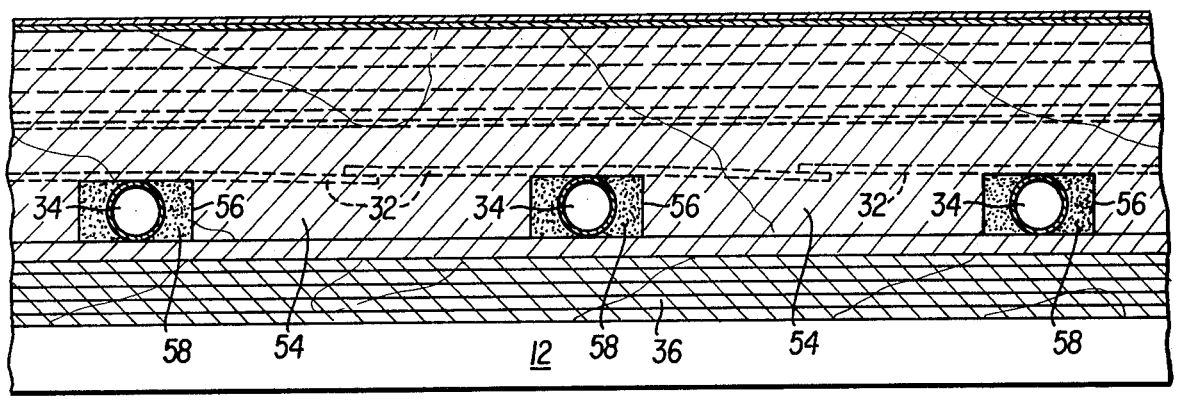
FIG. 5 is a schematic vertical cross-sectional view along the lines 5—5 of FIG. 4.

As shown in FIGS. 4–7, the peripheral frame 38 of the collector plate 14 is provided with a pair of steps 48 and 50 which respectively support the heat absorbing plate 30 discussed above and a glazing assembly 52. The step 48 which supports the heat absorbing plate 30 at the top periphery thereof includes a plurality of spacer blocks 54 which are spaced apart to form a plurality of spacer openings 56 through which the plurality of absorber pipes 34 exit the collector panel 14. Interior to the collector panel 14, the absorber fins 32 are supported by the spacer blocks 54 such that the fins 32 are essentially parallel to the base 36. The spacer openings 56 have a height generally corresponding to the outer diameter of the absorber pipe 34 such that each absorber pipe 34 is vertically clamped loosely within the spacer opening 56. The width of each spacer opening 56 is, however, considerably wider than the outer diameter of the absorber pipe 34 in order to accommodate movements of the pipes 34 resulting from thermal expansion of the pipe 34 and the manifold 84 or 85. Fiberglass insulation 58 is stuffed in the excess space between the absorber pipe 34 and the spacer blocks 54 in order to minimize convective airflow in order to maintain a moisture-free environment within the collector panel 14. As shown in FIGS. 2a and 6, the step 48 continues along the sides 60 of the collector panel 14. A continuous piece of wood without spacer openings is used along the sides 60 of the panel 14 in forming side portions of the step 48.

As shown in FIGS. 4–7, a metal liner 62 is provided on the peripheral frame 38. The metal liner 62 includes a portion 64 resting on the glazing step 50 and a U-shaped portion 65 extending around the frame 38 and the exterior thereof. A silicone gasket 66 is laid on the metal liner 62 resting on the glazing step 50 shown in detail in FIG. 2a. Seated on the silicone gasket 66 is the glazing assembly 52 which consists of a pair of 3/16 inch glass sheets 68 and 70 separated by a desiccant-filled spacer 72. The glazing assembly is readily commercially available and is produced by Fourco Glass Company under the Trade name "Clearlite II". Between the glazing assembly 52 and the U-shaped portion 65 of the metal liner 62 is provided an extruded gasket 74. Thereafter along the seam between the extruded gasket 74 and the top glass plate 68 of the glazing assembly 52 is provided a butyl sealant 75 which can be of the bead installation or tape type. It is noted that the silicone gasket 66, the extruded gasket 74, and the butyl sealant 75 are provided around the complete periphery of the frame 38. Therefore, each of these elements is seen in the respective views shown in FIG. 4, FIG. 6, and FIG. 7.

As was stated above, heat absorbing plate 30 is supported on the step 48 of the peripheral frame 38 with the individual absorber pipes 34 exiting the interior of the collector panel 14 through the spacer openings 56. Interior to the collector panel 14 in contact with the base 36 and beneath the plate 30 is provided a sheet 82 of aluminum foil reflective material which acts both as a vapor barrier and as an initial layer of insulation. Optionally, an additional layer of fiberglass insulation can be provided between the absorber fins 32 of the absorber plate 30 and the base 36 of the collector panel 14. The collector panels 14 as thus described are positioned in top and bottom rows 15 and 17, respectively, between the installation tracks 16, 18 and 20 and are ready for plumbing interconnection and final installation as hereinafter described.

Figure 8:
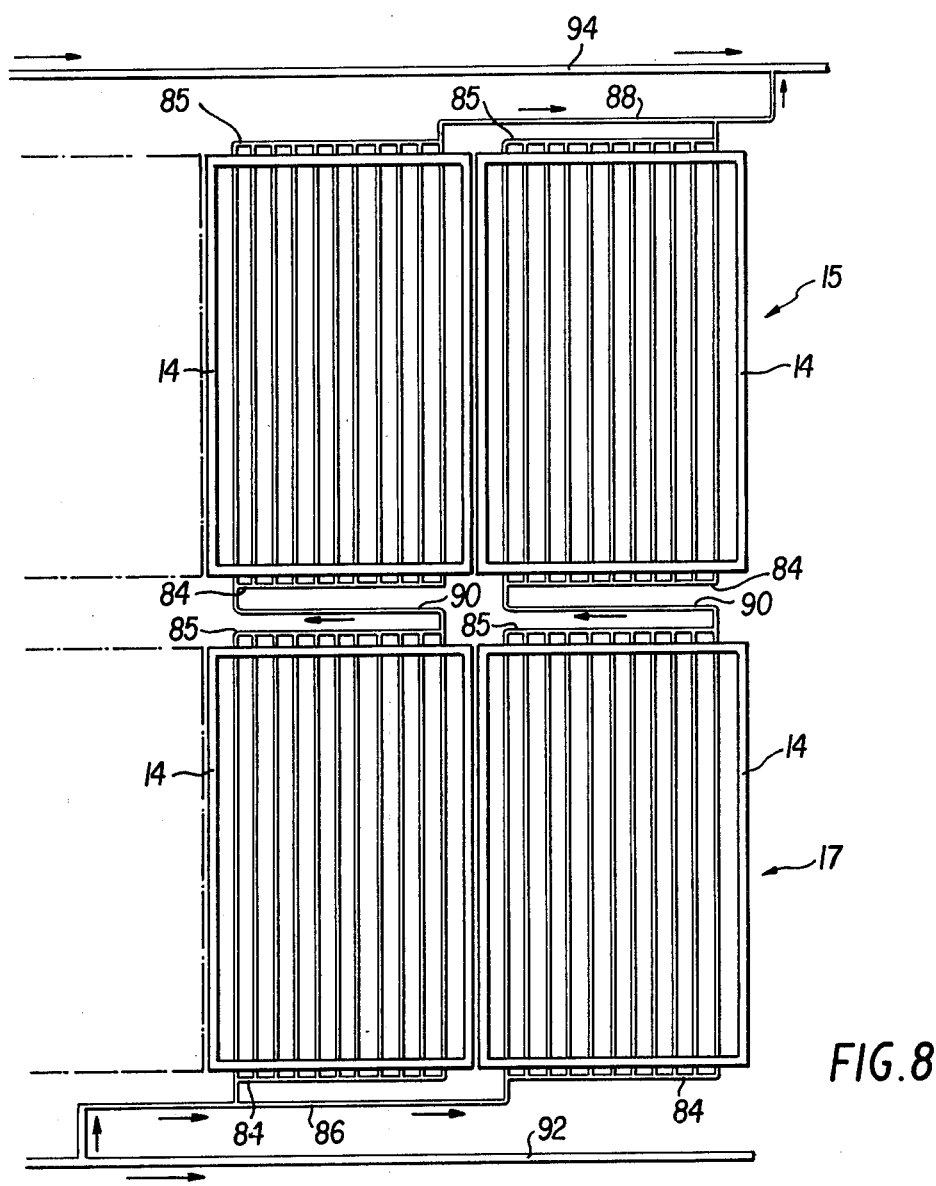
FIG. 8 is a schematic top plan view showing the system plumbing according to the invention.

Referring to FIGS. 4, 5, 7 and 8, the plumbing interconnections are now described. Each of the absorber pipes 34 of each absorber plate 30 extends through the spacer openings 56 into the plumbing channel 47 which is formed between the frame 38 and the leg 24 or 28 of the adjacent installation tracks 16, 18 or 20. The opposite ends of the absorber pipes 34 of a collector panel 14 are then respectively interconnected by means of an input manifold 84 and an output manifold 85. The input manifolds 84 of the bottom row 17 of collector panels 14 are connected to an input header 86, while the output manifolds 85 of the collector panels 14 of the top row 15 are connected to an output header 88. As shown in FIG. 8, the output manifold 85 of each collector panel 14 in the bottom row 17 is connected to the input manifold 84 of the vertically adjacent panel 14 in the top row 15 by the pipe segments 90 which are disposed generally horizontally in order to utilize the natural flexing of these pipe segments 90 during connection to the manifolds 84 and 85. The pipe segments 90, however, are provided with a slight vertical tilt to assure total drainage of the collector panels 14 when draining thereof is necessary. As shown in FIG. 8, it is seen that heat transport fluid from a supply line 92 enters the input header 86 which directs essentially equal quantities of fluid to each of the input manifolds 84 of each of the collector panels 14 of the bottom row 17 of collector panels 14. The input manifolds 84 then proportionately provides heat transport fluid to each of the absorber pipes 34 connected thereto. Fluid proceeds through the individual absorber pipes 34 and is recombined at the output manifold 85 of each collector panel 14. The fluid output of the output manifold 85 of the bottom row 17 is then serially directed to the input manifold 84 of the top row 15 of collector panels 14, to the individual absorber pipes 34 contained therein, and then recombined at the output manifold 85 of the top row 15 of collector panels 14. The outputs of each output manifold 85 are likewise also recombined at the output header 88 into a single return line 94. Thus, heat transport fluid is supplied to the solar heating collector assembly 10 via the supply line 92, absorbs heat as the fluid passes through the absorber pipes 34 of the serially connected vertically adjacent collector panels 14, and enters the solar heating system return line 94 which directs the heated transport fluid to a heat exchanger or the like (not shown) for utilization of the absorbed energy.

After installation of the manifold/header plumbing, the solar heating collector assembly 10 is ready for final installation wherein each of the collector panels 14 is mechanically interconnected and permanently fastened to the roof. At each corner of the collector base 36 is provided a fastening hole 110 by means of which the collector panel 14 is either screwed, nailed, bolted or otherwise fastened to the roof 12. The fastening of the collector panels 14 to the roof 12 is done prior to installation of the system plumbing and the external flashing. The loose clamping of the pipes 34 provides a degree of mechanical flexibility during the plumbing interconnections. After completion of the plumbing installation, and after the panels 14 are fastened to the roof 12, metal lined side tracks 96 are fastened to the roof 12 at the opposite ends 100 and 102, respectively, of the collector assembly 10. The side tracks 96, only one of which is shown in FIG. 2a, have a generally rectangular cross-section and extend along the entire sides of the opposite ends 100 and 102 in abutting relationship with the adjacent collector panels 14. The side tracks 96 are fastened to the roof 12 and are provided with a U-shaped sheet metal lining 104. After fastening of the metal lined side tracks 96 to the roof 12, sheet metal flashing, e.g. aluminum or galvanized iron sheet, generally L-shaped, is fastened to the roof 12 and the exterior sides of the side tracks 96, and the installation tracks 16 and 18. Thereafter, the collector panel 14 is mechanically connected either to an adjacent peripheral frame 38 of an adjacent collector panel 14, or an adjacent installation track 16, 18, or 20, or an adjacent side track 96 by means of sheet metal caps 108. The caps 108 are disposed horizontally and vertically overlapping the peripheral frame 38 and the glazing assembly 52, with the end of the cap 108 overlapping the glazing assembly 52 having a slight bend towards the glazing assembly 52 such that the cap 108 compresses the butyl sealant 75 and the extruded gasket 74 between the cap 108 and the glass sheet 68 of the glazing assembly 52. The sheet metal caps 108 are cut into horizontal and vertical strips, each having mitered corners, such that the overall cap assembly provides an airtight moisture seal to the interior of the plurality of collector panels 14. As shown in FIG. 2a, the cap 108 is riveted through the sheet metal lining 62 to the peripheral frame 38 of the collector panel 14 and to the sheet metal lining 104 of the side tracks 96, thereby securing the opposite sides 100 and 102 of the collector assembly 10. As shown in FIG. 7, the sheet metal caps 108 connecting vertically adjacent collector panels are riveted to the peripheral frame 38 of each collector panel 14 and to the leg 28 of the middle installation track 20 through the sheet metal liner 62 fastened thereto. As is also shown in FIG. 7, the caps of vertically adjacent collector panels 14 are riveted to each other, as well as to the metal lining 29 of the middle installation track 20, thereby further strengthening the construction of the solar heating collector assembly 10. As shown in FIG. 6, the sides 60 of horizontally adjacent collector panels 14 are mechanically connected by a common sheet aluminum cap 108 which is riveted to the metal liner 62 provided on the peripheral frame 38 of each collector panel 14. Thus, the construction and installation of the solar heating collector assembly according to the invention is completed upon installation of the caps 108 which provide moisture sealing of the interior of the individual collector panels 14 and which otherwise are believed to present an aesthetically pleasing exterior view of the collector assembly 10.

Optionally, prior to fastening the caps 108, fiberglass insulation (not shown) can be stuffed in the plumbing channels 47 around the manifold/header plumbing.

It is noted that the collector assembly 10 of the invention is designed to be attached to virtually any conventional truss roof 12 which may have as little as ⅝ of an inch thick plywood sheathing or which may be of the plank and beam deck construction type, since the static loading added by the collector is conservatively estimated at 11 pounds per square foot. For truss roofs, 6 inches of fiberglass insulation is normally used between the rafters underneath the collectors. For deck roofs, it is recommended that 2 inches of rigid glass insulation be installed over the roof under the collector panels 14.

From the above discussion it is seen that the collector assembly of the invention is rugged yet inexpensive, and fabricated of readily available materials. However, the details of the collector assembly implementation present additional advantages which are now described. Firstly, the installation tracks 16, 18 and 20 prevent sliding of the collector panels 14 and thereby promote safe installation. Furthermore, since these installation tracks actually become a part of the collector assembly, the possiblity of slipping or sliding of the collector panels 14 during the life of the collector assembly 10 is further diminished, and the structural integrity of the collector assembly thereby is enhanced. Still further, since the tracks do become part of the collector assembly 10, dismantelment thereof is not made necessary, thereby further facilitating installation. It is further noted that the liner/cap construction provides not only moisture proofing and mechanical clamping of adjacent collector panels 14, but also serves in a heat sinking capacity to minimize deleterious thermal effects which otherwise might jeopardize the integrity of the moisture seals.

Furthermore, the liner/cap construction in addition provides a condensation surface against which any moisture vapor interior to the collector panel 14 can condensate, thereby minimizing condensation of vapor moisture on the glazing assembly 52. Also, the provision of the sheet metal liners 29, 62 and 104 advantageously enables riveting of the sheet metal cap thereto, thereby promoting structural integrity and speedy installation.

Yet another important advantage of the collector assembly according to the invention lies in the fact that no plumbing connections whatsoever are made interior to the individual collector panels 14. Instead all plumbing connections, whether from the individual absorber pipes 34 to the manifolds 84 and 85, or whether from the manifolds 84 and 85 to the input or output headers 86 and 88, are made within the plumbing channels 47. As a result, in the event of the development of a leak, it would not be necessary to dismantel the individual collector panel 14, but merely to remove the caps 108 therefrom. Further in that regard, it is noted that any moisture entering the collector assembly 10 as a result of leakage within a plumbing channel 47 is confined to the plumbing channel 47 as a result of the fiberglass insulation 58 surrounding the individual absorber pipes 34 in the spacer openings 56. Thus, moisture condensation within the interior of a collector panel 14 is again minimized.

Further advantages of the collector assembly according to the invention inhere in the implementation of the absorber plate 30. Since the plate 30 is formed of a plurality of identical absorber elements, the overall selectivity of a collector panel can easily and flexibly be implemented simply in terms of the coating applied to the individual absorber fins 32. Thus, a simple flat black paint coating can be applied to all the absorber fins 32 when a relatively low absorber selectivity would be adequate, and when higher selectivities are required, such can be accomplished merely by applying a different coating of a higher selectivity to preselected of the absorber fins 32 such that the overall required selectivity of the heat absorbing plate 30 is thereby achieved. Further with regard to the absorber plate 30, and more particularly to the absorber pipes 34, it is noted that the pipe 34 extend minimally exterior to the collector panels 14 and in any event do not extend beyond the base 36 of the collector panel 14. Thus, during handling of the collector panel 14, the ends of the absorber pipes 34 extending exterior to the collector panel 14 are shielded from any bending forces which may be applied to the collector panel 14 by the extended base 36 underneath the absorber pipe 34.

Also, it is noted that the overall installation of the collector assembly according to the invention is implemented with a minimum amount of field activity. From the above discussion, it is seen that each collector panel 14 can be virtually entirely fabricated in the controlled environment of a factory setting, field installation limited primarily to the installation of the installation tracks, the system plumbing, and the collector caps. It is specifically noted that although the individual collector panels are only loosely assembled prior to installation of the collector caps 108, a high degree of structural integrity can be provided to the individual panels 14 during installation simply by applying temporary clamps to the corners of the panels prior to final installation.

As stated above, readily available materials are utilized to construct the collector assembly of the invention. In particular, plywood is used for the base 36, while the frame 38 is generally constructed of wood. The absorber fins 32 are formed of 12 oz per square foot copper, while ⅛ inch outer diameter (0.032 inches inner diameter) pipes are used for the absorber pipes 34. Also, 0.040 inch thick sheet aluminum or 24 gauge galvanized iron sheet is used for the metal liners 29, 62 and 104 and the caps 108.

Obviously, numerous modifications and variations of the present invention are possible in light of the above teachings. In particular, specific construction materials described herein are done so solely for the purpose of explanation, and other appropriate materials are obviously available as a matter of design choice. Likewise, the dimensions of the various collector components can also be selected per the requirements of a particular application. In that regard it is specifically noted that for installation on deck roofs, it may be desirable to employ side installation tracks having an L-shape cross-section, thereby forming additional plumbing channels to house the supply/return headers. This would avoid the necessity of piercing the roof decking to accommodate supply/return plumbing, and would shield this plumbing from view. Furthermore, any number of collector panels 14 and installation tracks 16, 18 or 20 can be employed, depending on the requirements of a particular application. It is therefore to be understood that within the scope of the appended claims, the invention may be practiced otherwise than as specifically described herein.

What is claimed as new and desired to be secured by letters patent of the United States is:

1. A solar heating collector assembly for heating a heat transport fluid from solar energy impinging on the surface of an area, such as the surface of a roof, comprising:
   at least one collector panel firmly attached to said surface, said collector panel having a base and a frame mounted on said base such that one pair of opposite ends of said base extends a first distance beyond the corresponding ends of said frame, said frame forming the walls of said collector panel; glazing means, mounted on said frame for providing a light transparent cover with high thermal impedance; and energy transformation means mounted in said frame for converting solar energy to heat and transferring converted heat to said heat transport fluid,
   wherein said energy transformation means comprises,
   a plurality of individual absorber elements, each element formed of a absorber fin and a fluid conduit in thermal contact with said fin and attached thereto, said absorber elements disposed within said frame with opposite ends of said fluid conduits extending a second distance outwardly of said frame through said corresponding opposite ends of said frame; and
   input and output manifolds located exterior to said frame and respectively connecting the opposite ends of said absorber fluid conduits such that the heat transport fluid branches from said input manifold to the individual absorber fluid conduits, flows through said conduits and is recombined by said output manifold;
   whereby all plumbing connections between said absorber fluid conduits and said input and output manifolds are made exterior to the collector panel frame.

2. A collector assembly according to claim 1, wherein each of said absorber fins is coated with a selected substance, each of which exhibits a predetermined selectivity;
   whereby a predetermined composite absorber selectivity is derived.

3. A collector assembly according to claim 1, wherein said first distance is greater than said second distance;
   whereby said absorber conduits are protected during handling of said collector panel by the panel base extending therebeneath.

4. A collector assembly according to claim 1, wherein said panel frame comprises:
   first and second steps on which is respectively supported said glazing means and said absorber fins;
   a plurality of spacer openings formed in said corresponding opposite ends of said frame, said absorber conduits passing through said openings, said openings having a cross-sectional area sufficiently large to accommodate dimensional changes in the length and spacing of said conduits due to thermal expansion and contraction of said conduits and said manifolds.

5. A collector assembly according to claim 1, wherein said glazing means comprises:
   top and bottom transparent glass sheets separated by a desiccant spacer disposed between said glass sheets and along the periphery of the glass sheets; and,
   sealing means between said glass sheets and said panel frame around the periphery of said glass sheets for providing a moisture seal to the interior of said collector panel.

6. A collector assembly according to claim 1, further comprising:
   a vapor barrier covering said base of said collector panel and attached thereto.

7. A collector assembly according to claim 6, wherein said vapor barrier comprises:
   aluminum foil.

8. A collector assembly according to claim 5, further comprising:
   at least two collector panels;
   first and second installation tracks each having a L-shaped cross-section formed by a track base and a track leg fastened to said track base at one end thereof, said installation tracks fastened to the surface of said area, said collector panels disposed between said tracks with said one pair of opposite ends of said collector panel base contiguous with said base of each of said tracks such that a pair of plumbing channels is formed in the space between said frame and each of said track legs;
   input and output headers respectively connected to said input and output manifolds of each of said collector panels, said input manifolds and headers disposed in one plumbing channel and said output manifolds and headers disposed in the other plumbing channel;
   a pair of side tracks fastened to said surface of said area generally perpendicular to said first and second installation tracks, said side track disposed contiguous to the outermost sides of the outermost collector panels such that each of said panels is retained in the spacer circumscribed by said installation tracks and said side tracks; and,
   means for fastening said collector panels to said installation tracks, said side tracks, and each other.

9. A solar heating collector assembly according to claim 8, wherein said fastening means comprises:
   said frame of each of said collector panels having a metal lining attached thereto around the exterior periphery thereof, said frame metal lining in contact with said glazing means;
   said L-shaped installation tracks having a metal lining attached to said legs thereof;
   said side tracks having metal linings attached thereto;
   metal caps contacting each glazing means of each collector panel in the vicinity of the entire peripheral edge of each glazing means, said metal caps fastened to the frame metal lining and to the metal linings of said installation and side tracks such that the sides and ends of said collector panels adjacent said installation and side tracks are respectively fastened thereto by said caps, and the sides of said collector panels adjacent other collector panels are also fastened to each other by said caps;
   whereby an mechanically integrated collector assembly is constructed; and,
   whereby said fastening means provides a heat sink and a condensation surface at the peripheral edge of each glazing means of each collector panel.

10. A collector assembly according to claim 9, wherein each of said metal linings of said collector panel frames, said installation tracks and said side tracks comprises:
   sheet aluminum.

11. A solar heating collector assembly according to claim 9, wherein said metal caps are riveted to said metal liners of said installation tracks, said side tracks and said collector panel frames.

12. A collector assembly according to claim 5, further comprising:
   a plurality of said collector panels arranged in rows and columns on said surface of said area;
   first and second installation tracks each having a L-shaped cross-section formed by a track base and a track leg appending lengthwise from said track base along one end thereof, said L-shaped installation tracks fastened to the surface of said area, said at least two rows of collector panels disposed between said L-shaped installation tracks such that said one pair of opposite ends of said base of said collector panels is parallel to said first and second installation tracks, and such that first and second plumbing channels are formed in the spaces between said legs of said L-shaped installation tracks and the frames of said collector panels adjacent thereto;
   a plurality of additional tracks each having a T-shaped cross-section formed by a base and a leg appending from said base of said T-shaped installation track at the center thereof, said T-shaped installation track disposed between said rows of collector panels parallel to said L-shaped installation tracks such that additional plumbing channels are formed in the spaces between said leg of said T-shaped installation track and the frames of said collector panels immediately adjacent thereto;
   said input and output manifolds of each column of said plurality of collector panels connected in series in said additional plumbing channels, such that each of said columns has a single input manifold and a single output manifold;
   input and output headers respectively disposed in said first and second plumbing channels respectively connected to said single input manifolds and said single output manifolds of said columns of collector panels;
   a pair of side tracks fastened to said surface of said area generally perpendicular to said L-shaped installation tracks, said side tracks disposed contiguous to the outermost sides of the outermost columns of said collector panels such that each of said plurality of collector panels is retained in the space circumscribed by said L-shaped installation tracks, said T-shaped installation tracks, said side tracks;
   means for fastening each of said collector panels to said L-shaped and said T-shaped installation tracks, said side tracks and to adjacent collector panels.

13. A solar heating collector assembly according to claim 12, wherein said fastening means comprises:
   said frame of each of said collector panels having a metal lining attached thereto around the exterior periphery thereof, said frame metal lining in contact with said glazing means;
   said L-shaped and said T-shaped installation tracks having a metal lining attached to said legs thereof;
   said side tracks having metal linings attached thereto;
   metal caps contacting each glazing means of each collector panel in the vicinity of the entire peripheral edge of each glazing means, said metal caps fastened to the frame metal lining and to the metal linings of said installation and side tracks such that the sides and ends of said collector panels adjacent said installation tracks and side tracks are respectively fastened thereto by said caps, and the sides of said collector panels disposed in said rows and adjacent other collector panels are also fastened to each other by said caps;
   whereby a mechanically integrated collector assembly is constructed; and,
   whereby said fastening means provides a heat sink and a condensation surface at the peripheral edge of each glazing means of each collector panel.

14. A solar heating collector assembly according to claim 13, wherein said metal caps are riveted to said metal linings of said L-shaped installation tracks, said T-shaped installation tracks, said side tracks and said collector panel frames.

15. A solar heating collector assembly according to claim 13, wherein said metal linings of said L-shaped installation tracks, said T-shaped installation tracks, said side tracks, and said collector panel frames and said caps comprise:
   sheet aluminum.

16. A solar heating collector assembly according to claim 13, wherein said metal linings of said L-shaped installation tracks, said T-shaped installation tracks, said side tracks, and said collector panel frames and said caps comprise:
   galvanized sheet iron.

* * * * *